E. E. HAUER.
TURBINE.
APPLICATION FILED DEC. 26, 1911.

1,102,745.

Patented July 7, 1914.

Witnesses
Grover Ilgen
Virgil Baker.

Inventor
Elmer E. Hauer
By Percy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

TURBINE.

1,102,745.   Specification of Letters Patent.   Patented July 7, 1914.

Application filed December 26, 1911. Serial No. 667,880.

*To all whom it may concern:*

Be it known that I, ELMER E. HAUER, a citizen of the United States, residing at Springfield, in the county of Clark and State of Ohio, have invented certain new and useful Improvements in Turbines, of which the following is a specification, reference being had therein to the accompanying drawings.
My invention relates to turbines and more particularly to a turbine for driving boiler tube cleaners that is adapted to travel with the cleaner through the tube, although it may be used for other purposes.
The object of my invention is to provide an improved turbine of this type having front and rear bearings, the front bearing being relatively large to permit the use of a wheel journal having openings or conduits therethrough for the discharge of the motive agent from the wheel.

With these and other objects in view my invention consists of the constructions and combinations hereinafter described and set forth in the claims.

Figure 1:
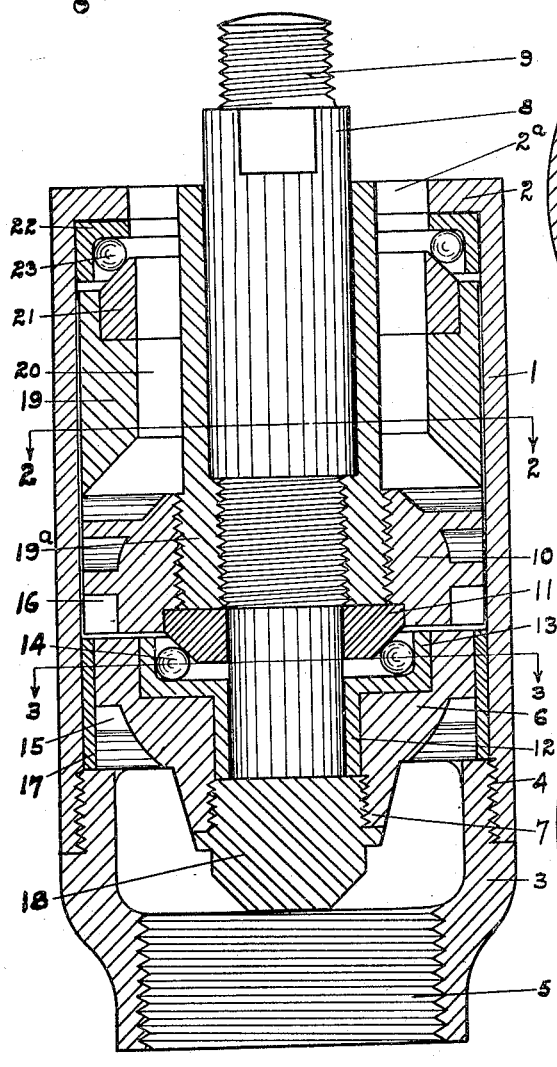
Figure 2:
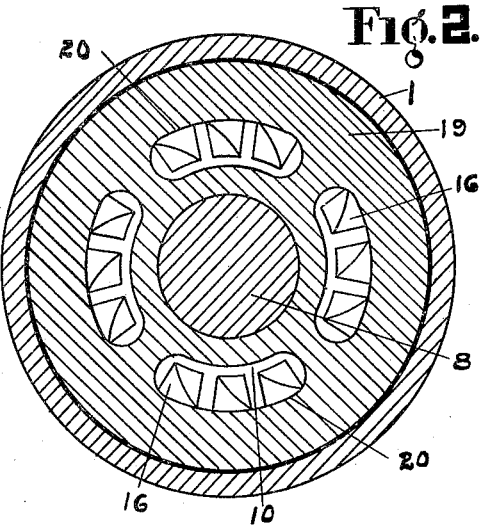
Figure 3:
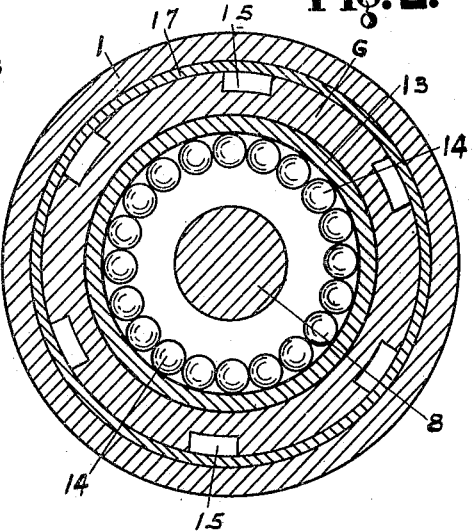

In the accompanying drawings which form a part of this specification Figure 1 is a longitudinal section of a motor embodying my invention and Figs. 2 and 3 are cross-sections on the lines 2—2 and 3—3 respectively of Fig. 1.

Like numerals represent the same parts in the several views.

In the drawings 1 is a casing having an integral front head 2 with an opening 2ª therethrough and a removable rear head 3 which projects forwardly into the casing and is screw-threaded at 4 thereto and said rear head is provided with a screw-threaded opening 5 to secure a supply conduit.

A disk or partition 6 is preferably formed integrally with said head 3 as shown and is provided with a rearwardly extending portion 7 to form a rear bearing for a shaft 8.
A wheel 10 is provided with a forward extension 19, the said extension being secured thereto by having a rearwardly extending hub 19ª to which the wheel is screw-threaded as shown; and said hub is screw-threaded to the shaft 8 which projects through an opening in said extension and is screw-threaded at 9 to attach the tool to be driven. The wheel extension 19 is provided with openings or conduits 20 through which the motive agent is discharged from the wheel.

A plain bushing, straight throughout its length, may be employed in the disk or partition 6 and its rearward extension in which to journal the shaft 8; but I preferably employ a bushing 12 having an enlarged portion 13 forming a ball-race to carry the balls 14 which bear against a cone-shaped ring 11 seated in a recess in the wheel and thereby forming both a journal and thrust bearing to carry the wheel and take the rearward thrust.

A cone-shaped ring 21 seated in a recess in the forward end of said wheel extension and an L shaped bushing 22 seated in the casing in the rear of the front head with the balls 23 between said ring and bushing forms both a journal and thrust bearing to carry the wheel and take the forward thrust.

The disk or partition 6 is provided with the usual inclined ports 15 which discharge into the buckets 16 of the wheel. A shroud 17 surrounds the disk or partition 6 and a cap 18 closes the rear end of the rear bearing.

Having thus described my invention I claim:—

1. In a turbine, a casing having a head with an opening therethrough, a wheel having a forward extension journaled peripherally in said casing, with a centrally disposed portion adapted to attach the tool to be driven, said extension having openings exterior to said centrally disposed portion and radially inside the circle of said journal for the discharge of the motive agent from the wheel buckets through the opening in said head.

2. In a turbine, a casing having a head with an opening therethrough, a wheel having a forward extension journaled peripherally in said casing, with a centrally disposed shaft adapted to attach the tool to be driven, said wheel extension having openings or conduits therethrough exterior to said shaft and radially inside the circle of said journal for the discharge of the motive agent from the wheel buckets through the opening in said head.

3. In a turbine, a casing having a head with an opening therethrough, a wheel having a forward extension with a centrally disposed shaft adapted to attach the tool to be driven, a journal and thrust bearing interposed between said wheel extension and casing to carry and take the thrust of said wheel, said wheel extension having openings or conduits therethrough exterior to said shaft and radially inside the circle of said bearing for the discharge of the motive agent from the wheel buckets.

4. In a turbine, a casing having a front head with an opening therethrough, a wheel having a forward extension journaled peripherally in said casing, a shaft on which said wheel is mounted and a bearing for said shaft in the rear of said wheel, said wheel extension having openings or conduits therethrough exterior to said shaft and radially inside the circle of said journal for the discharge of the motive agent from said wheel buckets through the opening in said head.

5. In a turbine, a casing having a front head with an opening therethrough, a wheel having a forward extension journaled peripherally in said casing, a shaft on which said wheel is mounted and a journal and thrust bearing for said shaft in the rear of said wheel, said wheel extension having openings or conduits therethrough exterior to said shaft and radially inside the circle of said peripheral journal for the discharge of the motive agent from the wheel buckets.

6. In a turbine, a casing having an integral front head with an opening therethrough, a wheel having a forward extension with a journal and thrust bearing therefor interposed between said casing and extension and in the rear of said front head, a shaft on which said wheel is mounted, said shaft projecting forwardly through said extension and rearwardly from said wheel, a ported disk or partition having a journal and thrust bearing for said shaft, the ports being disposed radially outside the circle of said bearing, and a removable supply head secured to said casing, said wheel extension having openings or conduits therethrough radially inside the circle of the front bearing for the discharge of the motive agent from the wheel buckets through the opening in the front head.

7. In a turbine, a casing having a head at its front end with an opening therethrough, a wheel with a forward extension projecting into said opening and forming therewith an annular outlet through said head, said extension being journaled peripherally in said casing in the rear of said head and having through its body longitudinally extending conduits radially inside the circle of said journal in line with and having a free discharge through said outlet.

In testimony whereof I have hereunto affixed my signature in the presence of two witnesses.

ELMER E. HAUER.

Witnesses:
 GROVER ILGEN,
 O. H. HAUSE.

Copies of this patent may be obtained for five cents each, by addressing the "Commissioner of Patents, Washington, D. C."